United States Patent
Turney

(10) Patent No.: US 11,566,841 B2
(45) Date of Patent: Jan. 31, 2023

(54) CRYOGENIC LIQUEFIER BY INTEGRATION WITH POWER PLANT

(71) Applicant: L'Air Liquide, Societe Anonyme pour l'Etude et l'Exploitation des Procedes Georges Claude, Paris (FR)

(72) Inventor: Michael A Turney, Houston, TX (US)

(73) Assignee: L'Air Liquide, Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 679 days.

(21) Appl. No.: 16/697,593

(22) Filed: Nov. 27, 2019

(65) Prior Publication Data
US 2021/0156303 A1 May 27, 2021

(51) Int. Cl.
F25J 3/04 (2006.01)
F25J 1/00 (2006.01)
F25J 1/02 (2006.01)

(52) U.S. Cl.
CPC .......... *F25J 3/0406* (2013.01); *F25J 1/0015* (2013.01); *F25J 1/0027* (2013.01); *F25J 1/0222* (2013.01); *F25J 3/04248* (2013.01); *F25J 3/04393* (2013.01); *F25J 2200/02* (2013.01); *F25J 2205/40* (2013.01); *F25J 2205/80* (2013.01); *F25J 2210/50* (2013.01); *F25J 2210/58* (2013.01); *F25J 2210/70* (2013.01); *F25J 2230/08* (2013.01); *F25J 2270/02* (2013.01)

(58) Field of Classification Search
CPC ...... F25J 1/0015; F25J 3/0406; F25J 3/04393; F25J 2230/42; F25J 2270/06; F25J 3/04248; F25J 3/04018; F25J 3/04296; F25J 3/04303; F25J 2230/08; F25J 2240/10
See application file for complete search history.

(56) References Cited

U.S. PATENT DOCUMENTS

| | | | | |
|---|---|---|---|---|
| 5,704,229 | A | * | 1/1998 | Coakley ............... F25J 3/04381 62/646 |
| 5,724,805 | A | | 3/1998 | Golomb et al. |
| 5,845,517 | A | * | 12/1998 | Attlfellner ........... F25J 3/04357 62/915 |
| 8,501,125 | B2 | | 8/2013 | Vandor |
| 2010/0018218 | A1 | | 1/2010 | Riley et al. |

(Continued)

*Primary Examiner* — John F Pettitt, III
(74) *Attorney, Agent, or Firm* — Justin K. Murray

(57) ABSTRACT

A method for producing liquid nitrogen using a residual gas stream derived from a flue gas of a power plant is provided. The residual gas stream is purified in a front-end purification unit to remove freezable components and then the purified stream is compressed. Following compression, the stream can be divided into a first portion and a second portion, wherein the first portion is cooled and sent to a distillation column, wherein oxygen and argon are separated, thereby leaving an essentially pure gaseous nitrogen stream. The gaseous nitrogen stream can then be liquefied using refrigeration provided by expanding the second portion of the purified stream. In a preferred embodiment, the second portion is expanded in two turbines, and the gaseous nitrogen is compressed in a cold nitrogen booster, which is powered by one of the two turbines. In an additional embodiment, after warming, the expanded second portion of the purified stream can be used to regenerate the front-end purification unit.

14 Claims, 2 Drawing Sheets

(56) References Cited

U.S. PATENT DOCUMENTS

| | | | |
|---|---|---|---|
| 2012/0297823 A1* | 11/2012 | Davidian | F25J 3/04412 62/643 |
| 2015/0121955 A1* | 5/2015 | Davidian | F25J 1/0012 62/643 |
| 2015/0168058 A1* | 6/2015 | Musicus | F25J 3/04393 62/640 |
| 2016/0109180 A1* | 4/2016 | Hirose | F25J 1/0224 62/651 |
| 2017/0038136 A1* | 2/2017 | Turney | F25J 1/0022 |
| 2017/0176098 A1* | 6/2017 | Kong | F25J 3/04206 |
| 2018/0313603 A1* | 11/2018 | Nagata | F25J 1/0045 |
| 2019/0282952 A1* | 9/2019 | Li | C01B 32/50 |
| 2019/0293348 A1* | 9/2019 | Hirose | F25J 5/005 |

\* cited by examiner

CRYOGENIC LIQUEFIER BY INTEGRATION WITH POWER PLANT

TECHNICAL FIELD

The present invention generally relates to a method for producing liquid nitrogen. The method is particularly useful for producing large amounts of liquid nitrogen without consuming additional energy.

BACKGROUND OF THE INVENTION

Power plants based on steam production typically produce a flue gas having large amounts of carbon dioxide. For environmental reasons, the carbon dioxide within the flue gas is captured. One such current carbon dioxide capture method includes the use of a low-temperature membrane system in which the carbon dioxide is collected on the permeate side as a low pressure stream, while the remaining retentate stream, which can contain more than 90% nitrogen, is at a pressure similar to the feed pressure (e.g., 15 bara). In methods known heretofore, a portion of this high-pressure retentate stream can be letdown across a turbine in order to generate refrigeration for the carbon dioxide capture. The remaining portion of the high-pressure retentate stream is available to be utilized for other purposes, such as let down in a combined cycle turbine to generate power, with the stream ultimately being vented to the atmosphere.

FIG. 1 provides a schematic of a system as described above. As shown in FIG. 1, flue gas 2 is withdrawn from a power plant and sent to a pretreatment unit. From there, the treated gas stream is compressed in a compressor, with the heat of compression being removed using boiler feed water (BFW). The compressed stream 4 is then dried in dryer before being cooled in heat exchanger. After cooling the stream is separated in a cold membrane, wherein the majority of the carbon dioxide permeates through the membrane and is then compressed, liquefied, and then heated again before being collected as CO2 product stream 6.

The retentate 8, which contains more than 90% nitrogen and more than 1% argon, remains at high pressure (about 15 bara), wherein a portion of it is used to provide refrigeration for the heat exchanger by expanding in cold expansion. The remaining portion 10 can be used for other purposes, for example, expanding in a turbine to provide additional power.

Therefore, there exists a need for a method of more efficiently utilizing all of the available streams.

BRIEF SUMMARY OF THE INVENTION

The present invention is directed to a device and a method that satisfies at least one of these needs. The objective of the current invention is to utilize this remaining portion of the high-pressure retentate stream in order to provide large amounts of liquid nitrogen, preferably without the use of any externally-powered compressors (e.g., compressors powered by a motor).

In one embodiment, the high-pressure retentate stream is purified of freezable components (e.g., any components that would freeze at nitrogen liquefaction temperatures such as carbon dioxide) in a front-end purification system. This purified stream can then be split into a first portion and a second portion, wherein the first portion is cooled and sent to a distillation column, wherein oxygen and argon are separated, thereby leaving an essentially pure gaseous nitrogen stream. The gaseous nitrogen stream can then be liquefied using refrigeration provided by expanding the second portion of the purified stream. In a preferred embodiment, the second portion is expanded in two turbines, and the gaseous nitrogen is compressed in a nitrogen booster, which is powered by one of the two turbines. In an additional embodiment, after warming, the expanded second portion of the purified stream can be used to regenerate the front-end purification unit.

In one embodiment, a method for producing liquid nitrogen is provided. In one embodiment, the method comprises: providing a residual gas stream, wherein the residual gas stream is sourced from a retentate stream of a cold membrane, wherein the residual gas stream comprises nitrogen, argon, oxygen, and carbon dioxide; purifying the residual gas stream in a front-end purification unit to remove carbon dioxide, thereby forming a purified residual gas stream; compressing the purified residual gas stream in a first compressor to form a pressurized residual gas stream; introducing the pressurized residual gas stream to a cold box, wherein a first portion of the pressurized residual gas stream is cooled in a main heat exchanger, expanded within the cold box, and then fed to a distillation column system for separation therein, thereby forming a nitrogen stream and a waste stream; withdrawing the waste stream from the distillation column system and warming said waste stream; and withdrawing the nitrogen enriched stream from the distillation column and compressing the nitrogen stream in a second compressor before liquefying the nitrogen stream within the cold box to produce a liquid nitrogen stream, wherein a second portion of the pressurized residual gas stream is partially cooled in the main heat exchanger and then expanded in a plurality of cold turbines that are configured to provide sufficient cooling energy to liquefy the nitrogen stream In optional embodiments of the method for producing liquid nitrogen:

the residual gas stream is derived from a flue gas stream from a power plant;
the plurality of cold turbines comprises a first turbine and a second turbine, wherein the first and second turbines operate in series and at different temperatures;
the first turbine has a warmer inlet temperature as compared to the second turbine, wherein the first turbine is configured to drive the first compressor, wherein the second turbine is configured to drive the second compressor;
the second compressor is a cold compressor operating with an inlet temperature less than −100° C.
the second compressor is a cold compressor operating with an inlet temperature less than −130 C;
the plurality of cold turbines power the first compressor and the second compressor, such that the purified residual gas stream and the nitrogen enriched stream are compressed without the use of any externally-powered compressors;
the first portion of the pressurized residual gas stream is expanded across a Joule-Thompson valve prior to being fed to the distillation column system;
the liquid nitrogen stream is subcooled in a subcooler before being stored in a liquid nitrogen tank;
the method further comprises the step of warming the second portion of the pressurized residual gas stream, after expansion in the plurality of cold turbines, in the main heat exchanger;
the liquid nitrogen stream is subcooled in a subcooler, and then a first portion of the subcooled nitrogen is stored in a liquid nitrogen tank and a second portion of the subcooled nitrogen is expanded across a second Joule-Thompson valve and heated in the subcooler and the main heat exchanger;

the method further comprises regenerating the front-end purification unit using a stream selected from the group consisting of the expanded second portion of the pressurized residual gas stream, the waste stream, the second portion of the subcooled nitrogen, and combinations thereof;

the residual gas stream is at a pressure above 13 bara; and/or the method comprises an absence of providing external refrigeration such that the liquid nitrogen is produced with only cooling provided by the expansion of streams derived from the residual gas stream.

In another embodiment, a method for producing liquid nitrogen is provided. In this embodiment, the method comprises the steps of: providing a residual gas stream, wherein the residual gas stream is sourced from a retentate stream of a cold membrane used to separate carbon dioxide from a flue gas stream sourced from a combustion zone of a power plant, wherein the residual gas stream comprises nitrogen, argon, oxygen, and carbon dioxide; purifying the residual gas stream in a front-end purification unit to remove carbon dioxide, thereby forming a purified residual gas stream; compressing the purified residual gas stream in a first compressor to form a pressurized residual gas stream; cooling a first portion of the purified residual gas stream in a main heat exchanger and then expanding the first portion in a Joule-Thompson valve before introducing the first portion to a distillation column configured to produce a nitrogen enriched fluid and a waste stream; cooling a second portion of the purified residual gas stream in the main heat exchanger and then expanding the second portion in a first turbine and a second turbine to form an expanded second portion; warming the expanded second portion in the main heat exchanger against the first portion and the second portion; compressing the nitrogen enriched fluid in a second compressor and then cooling the nitrogen enriched fluid to form liquid nitrogen; storing a first portion of the liquid nitrogen in a storage tank; and expanding a second portion of the liquid nitrogen across a second Joule-Thompson valve and warming the expanded second portion of the liquid nitrogen in the main heat exchanger In optional embodiments of the method for producing liquid nitrogen:

the method further comprises regenerating the front-end purification unit using a warm stream that has been warmed in the main heat exchanger and that is selected from the group consisting of the expanded second portion of the pressurized residual gas stream, the waste stream, the second portion of the liquid nitrogen, and combinations thereof;

the method comprises an absence of providing external refrigeration such that the liquid nitrogen is produced with only cooling provided by the expansion of streams derived from the residual gas stream; and/or the first and second turbines power the first and second compressors, such that the purified residual gas stream and the nitrogen enriched stream are compressed without the use of any externally-powered compressors The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

Figure 1:
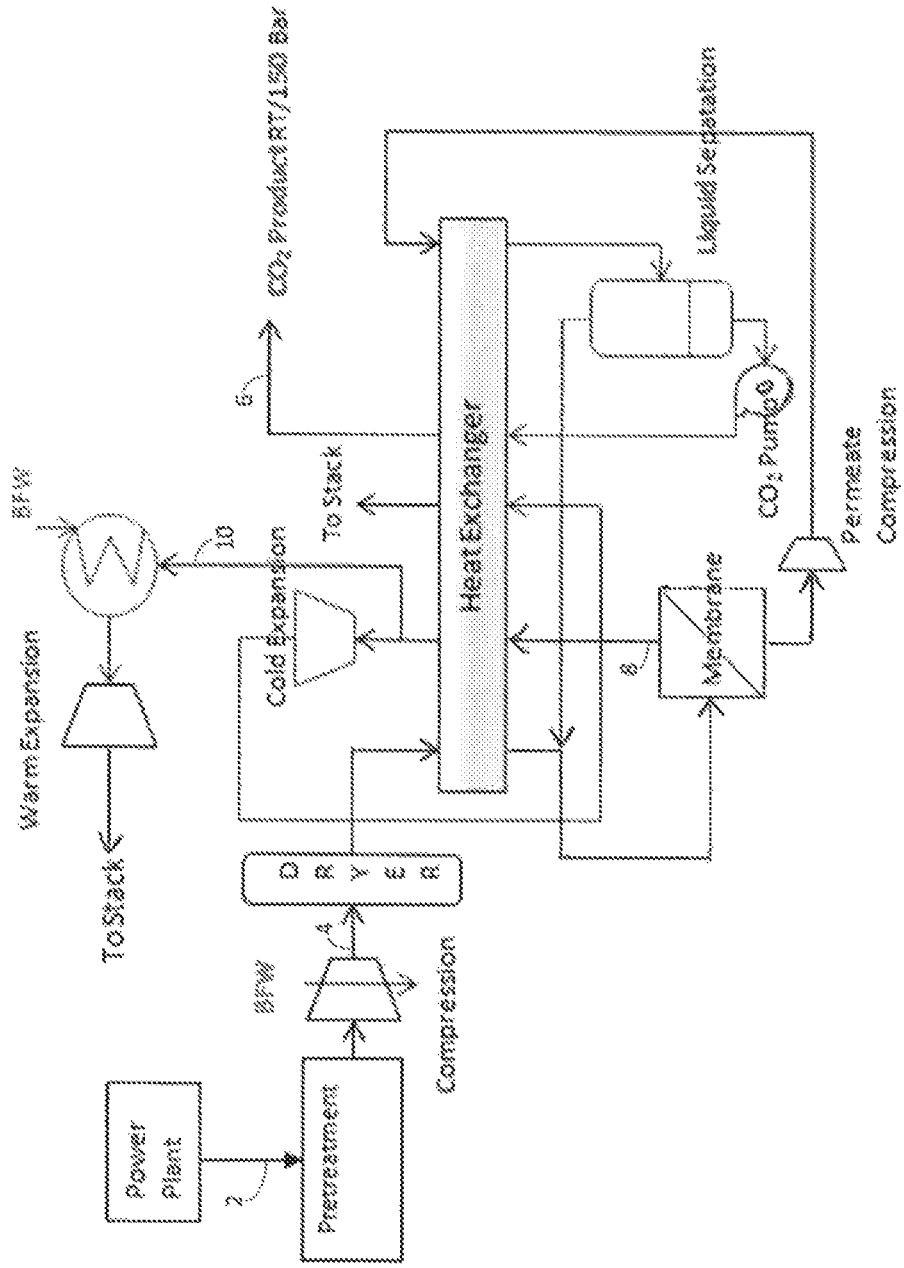
FIG. 1 is a process flow diagram of an existing power plant and carbon dioxide cold capture.
Figure 2:
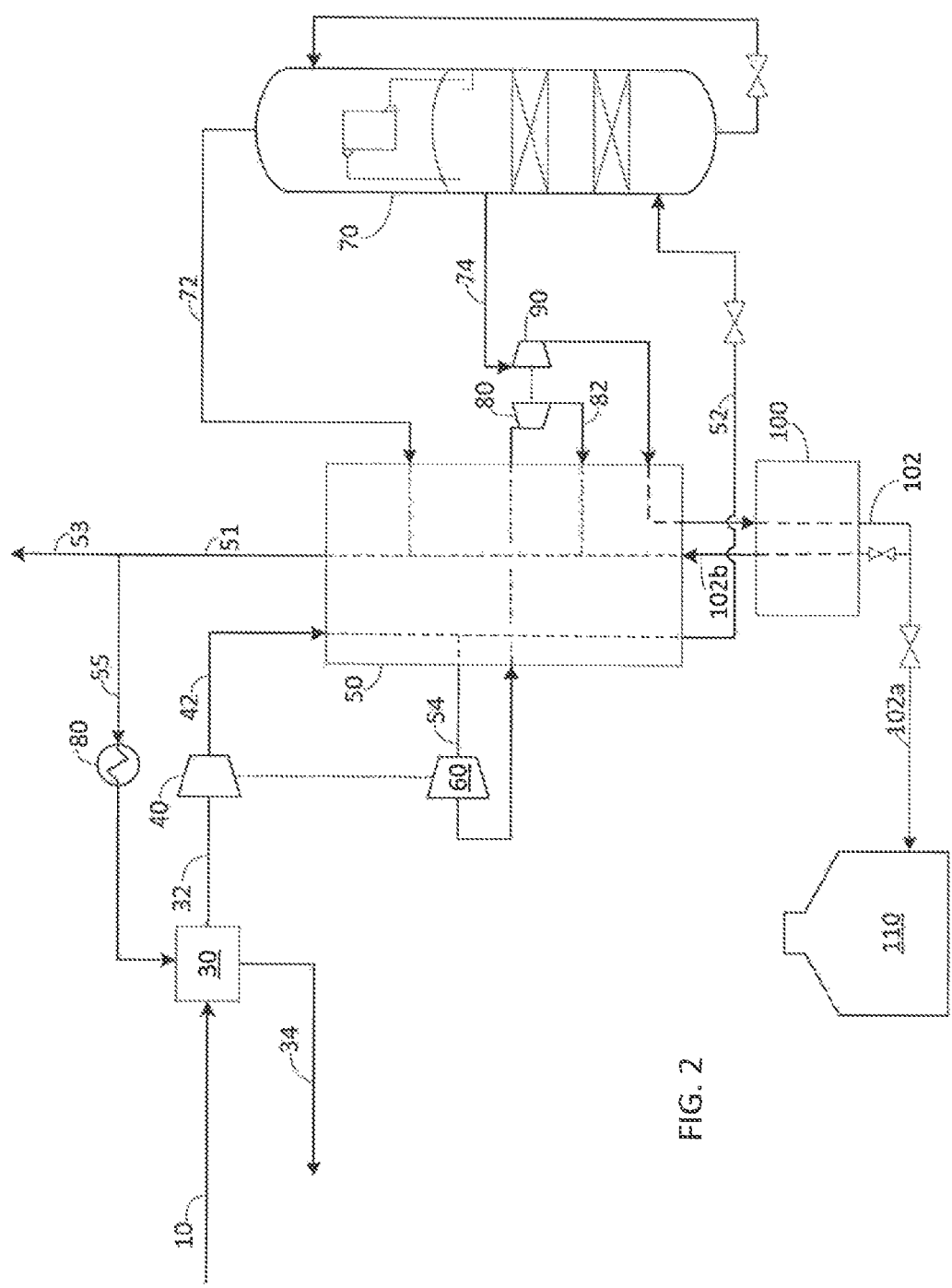
FIG. 2 is a process flow diagram of an embodiment of the present invention.

Referring to FIG. 2, pressurized residue stream 10, which contains nitrogen, oxygen, argon, and carbon dioxide and is preferably at a pressure of at least 15 bara, is sent to front-end purification unit 30 to remove components such as carbon dioxide that would freeze at cryogenic temperatures (e.g., below −40° C.). Purified stream 32 is then compressed in first compressor 40 to a pressure of about 20 bara in this example to form pressurized stream 42 before being cooled in main heat exchanger 50.

Pressurized stream 42 is split into first portion 52 and second portion 54. In the embodiment shown, the split occurs within main heat exchanger 50; however, the split can also occur upstream heat exchanger 50. First portion 52 is further cooled and expanded across a Joule-Thompson valve before being introduced into distillation column system 70, which in the embodiment shown comprises a nitrogen column (e.g., a single column with top condenser-reboiler). Those of ordinary skill in the art will readily understand that any system that is suitable for separating nitrogen from oxygen and argon can be used, for example, double or triple columns or column setups conducive for producing argon.

In the embodiment shown, distillation column system 70 is preferably configured to produce waste gas 72 and nitrogen enriched stream 74. Waste gas 72 is sent to main heat exchanger 50 for warming.

In the embodiment shown, nitrogen enriched stream 74 is preferably further compressed in second compressor 90 before the compressed nitrogen stream is liquefied in main heat exchanger 50 and then subcooled in subcooler 100. After subcooling, the liquid nitrogen 102 is preferably split into first portion 102a and second portion 102b, with first portion 102a being introduced into storage tank 110 as product, and second portion 102b being expanded in order to provide refrigeration for subcooler 100 and main heat exchanger 50.

Power for the first and second compressors is provided for by expanding second portion of the pressurized stream 54 in the first and second turbines 60, 80. After expansion, the expanded second portion 82 is warmed in the main heat exchanger 50. In the embodiment shown, the expanded second portion 82, the second portion 102b, and the waste gas 72 are combined within main heat exchanger to form combined waste stream 51; however, this is not required.

In a preferred embodiment, a first portion 55 of combined waste stream 51 is warmed and then used to regenerate front-end purification system 30, with the regenerated gas, which now contains the desorbed carbon dioxide, being sent back, along with second portion of combined waste stream 53, to the flue gas vent stack.

Working Example

A simulation was run using the embodiment shown in FIG. 2. 456 mt/h of pressurized residue stream 10 containing 93.7% nitrogen, 3.3% oxygen, 1.1% argon, and 1.9% CO2 and at 15 bara was compressed to 20 bara in first compressor 40. Approximately 246 mt/h (approximately 54%) of flow was sent to the distillation column system 70, with the remainder being expanded in the plurality of turbines. Approximately 923 mtpd liquid nitrogen was produced, all without using any externally powered compressors.

Consequently, preferred embodiments of the current invention allow a user to utilize the pressurized residue stream of a cold membrane separator to produce large amounts of liquid nitrogen with essentially zero compression energy costs.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step or reversed in order.

The singular forms "a", "an" and "the" include plural referents, unless the context clearly dictates otherwise.

"Comprising" in a claim is an open transitional term which means the subsequently identified claim elements are a nonexclusive listing (i.e., anything else may be additionally included and remain within the scope of "comprising"). "Comprising" as used herein may be replaced by the more limited transitional terms "consisting essentially of" and "consisting of" unless otherwise indicated herein.

"Providing" in a claim is defined to mean furnishing, supplying, making available, or preparing something. The step may be performed by any actor in the absence of express language in the claim to the contrary a range is expressed, it is to be understood that another embodiment is from the one.

Optional or optionally means that the subsequently described event or circumstances may or may not occur. The description includes instances where the event or circumstance occurs and instances where it does not occur.

Ranges may be expressed herein as from about one particular value, and/or to about another particular value. When such particular value and/or to the other particular value, along with all combinations within said range.

All references identified herein are each hereby incorporated by reference into this application in their entireties, as well as for the specific information for which each is cited.

What is claimed is:

1. A method for producing liquid nitrogen, the method comprising the steps of:
   providing a residual gas stream, wherein the residual gas stream is sourced from a retentate stream of a cold membrane, wherein the residual gas stream comprises nitrogen, argon, oxygen, and carbon dioxide;
   purifying the residual gas stream in a front-end purification unit to remove carbon dioxide, thereby forming a purified residual gas stream;
   compressing the purified residual gas stream in a first compressor to form a pressurized residual gas stream;
   introducing the pressurized residual gas stream to a cold box, wherein a first portion of the pressurized residual gas stream is cooled in a main heat exchanger, expanded within the cold box, and then fed to a distillation column system for separation therein, thereby forming a nitrogen stream and a waste stream;
   withdrawing the waste stream from the distillation column system and warming said waste stream; and
   withdrawing the nitrogen stream from the distillation column system and compressing the nitrogen stream in a second compressor before liquefying the nitrogen stream within the cold box to produce a liquid nitrogen stream,
   wherein at least a portion of the liquid nitrogen stream is stored in a liquid nitrogen tank;
   wherein a second portion of the pressurized residual gas stream is partially cooled in the main heat exchanger and then expanded in a plurality of cold turbines;
   wherein the second compressor is a cold compressor operating with an inlet temperature less than −100 C.

2. The method of claim 1, wherein the residual gas stream is derived from a flue gas stream from a power plant.

3. The method of claim 1, wherein the plurality of cold turbines comprises a first turbine and a second turbine, wherein the first and second turbines operate in series and at different temperatures.

4. The method of claim 3, wherein the first turbine has a warmer inlet temperature as compared to the second turbine, wherein the first turbine is configured to drive the first compressor, wherein the second turbine is configured to drive the second compressor.

5. The method of claim 1, wherein the second compressor inlet temperature is less than −130 C.

6. The method of claim 1, wherein the plurality of cold turbines power the first compressor and the second compressor, such that the purified residual gas stream and the nitrogen stream are compressed without the use of any externally-powered compressors.

7. The method of claim 1, wherein the first portion of the pressurized residual gas stream is expanded across a Joule-Thompson valve prior to being fed to the distillation column system.

8. The method of claim 1, wherein the liquid nitrogen stream is subcooled in a subcooler before being stored in the liquid nitrogen tank.

9. The method of claim 1, further comprising the step of warming the second portion of the pressurized residual gas stream, after expansion in the plurality of cold turbines, in the main heat exchanger.

10. The method of claim 1, wherein the liquid nitrogen stream is subcooled in a subcooler, and then a first portion of the subcooled nitrogen is stored in the liquid nitrogen tank and a second portion of the subcooled nitrogen is expanded across a second Joule-Thompson valve and heated in the subcooler and the main heat exchanger.

11. The method of claim 10, further comprising regenerating the front-end purification unit using a stream selected from the group consisting of the expanded second portion of the pressurized residual gas stream, the waste stream, the second portion of the subcooled nitrogen, and combinations thereof.

12. The method of claim 1, wherein the residual gas stream is at a pressure above 13 bara.

13. The method of claim 1, wherein the method comprises an absence of providing external refrigeration such that the liquid nitrogen is produced with only cooling provided by the expansion of streams derived from the residual gas stream.

14. The method of claim 1, expanding a second portion of the liquid nitrogen stream across a second Joule-Thompson valve forming an expanded second portion and warming the expanded second portion in the main heat exchanger.

* * * * *